United States Patent

Presby

Patent Number: 5,954,451
Date of Patent: Sep. 21, 1999

[54] MULTI-LAYER MATERIAL FOR PROCESSING SEPTIC EFFICIENT AND WASTE WATER AND METHOD OF USING THE SAME

[76] Inventor: David W. Presby, P.O. Box 617, Sugar Hill, N.H. 03585

[21] Appl. No.: 08/998,351

[22] Filed: Dec. 18, 1997

Related U.S. Application Data

[63] Continuation-in-part of application No. 08/526,437, Sep. 11, 1995, abandoned.

[51] Int. Cl.$^6$ .......................... B01D 29/19; B01D 29/60; E02B 11/00
[52] U.S. Cl. .............................................. 405/49; 405/36
[58] Field of Search ................................. 405/21, 26, 31, 405/36, 49

[56] References Cited

U.S. PATENT DOCUMENTS

| | | | |
|---|---|---|---|
| 3,440,822 | 4/1969 | Hegler | 405/49 X |
| 3,946,762 | 3/1976 | Green | 405/45 |
| 3,961,153 | 6/1976 | Maroschak | 405/49 |
| 3,976,578 | 8/1976 | Beane | 210/484 |
| 4,163,619 | 8/1979 | Fales | 405/49 |
| 4,182,581 | 1/1980 | Uehara et al. | 405/49 X |
| 4,204,967 | 5/1980 | Bannister | 405/49 X |
| 4,288,321 | 9/1981 | Beane | 210/170 |
| 4,662,778 | 5/1987 | Dempsey | 405/35 |
| 4,904,113 | 2/1990 | Goddard et al. | 405/45 |
| 4,909,665 | 3/1990 | Caouette | 405/45 |
| 4,950,103 | 8/1990 | Justice | 405/45 X |
| 5,002,427 | 3/1991 | Kambe et al. | 405/36 |

OTHER PUBLICATIONS

Viessman, Jr., Warren and Hammer, Mark J., Water Supply and Pollution Control, Fifth Ed, Harper Collins College Publishers, pp. 275–277 and 504–505, 1993.

Linsley, Ray K. et al., Water Resources Engineering, Fourth Ed., McGraw–Hill, Inc. p. 379, 1992.

*Primary Examiner*—David Bagnell
*Assistant Examiner*—Tara L. Mayo
*Attorney, Agent, or Firm*—George W. Dishong

[57] ABSTRACT

A device/apparatus for using a multilayer fabric of varying deniers for the processing and treatment of fluids which must be treated to remove materials so that the resultant treated fluid may be reused and/or returned to the earth and particularly to the water table. More particularly the multi-layer fabric, each layer being of selected denier, is used in combination with conduit in a drainage field or leaching system usually associated with a septic tank or septic system. Most particularly the multilayer fabric of varying deniers is wrapped around corrugated plastic pipe of the type well known in the field of drainage or leaching fields. At least one of the multilayer fabric layers is formed from an unstructured assemblage of fibers. The unstructured assemblage of fibers are supported by an outer sheeting. Oils, greases and chemicals contained in the fluids to be treated and entering within the fluid conducting conduit structure are entrapped within at least one of the first layers and at least one additional layer of fabric and particularly on the unstructured assemblage of fibers. The unstructured assemblage of fibers provides a large surface area whereon consequent biodegradation of said oils, greases and chemicals takes place permitting treated fluid to pass omnidirectionally through the unstructured assemblage of fibers and subsequently leach into the ground. The particular objectives, features and advantages of the device are: 1) Multiple layers of fabric; 2) Fabric layers of varying deniers; 3) Useful in wrapping corrugated plastic pipe; 4) With the selection of fabric and fabric denier, specific fluid treatment objective can be met; 5) The multilayer fabric provides boundaries/interfaces and regions within which specifically chosen bacteria, chemicals, microbes and the like may be introduced to facilitate the biodegradation of specifically chosen undesirable materials; and 6) Improve performance over the currently known leach fields.

16 Claims, 4 Drawing Sheets

MULTI-LAYER MATERIAL FOR PROCESSING SEPTIC EFFICIENT AND WASTE WATER AND METHOD OF USING THE SAME

This application is a continuation-in-part of application Ser. No. 08/526,437 filed on Sep. 11, 1995, now abandoned.

BACKGROUND OF THE INVENTION

1. Field of the Invention

This invention most generally relates to a device/apparatus for using a multilayer fabric of varying deniers for the processing and treatment of fluids which must be treated to remove materials so that the resultant treated fluid may be reused and/or returned to the earth and particularly to the water table. More particularly the invention relates to the use of multilayer fabric, each layer being of selected denier, in combination with conduit, either smooth-walled or corrugated, in a drainage field or leaching system usually associated with a septic tank or system. At least one of the layers of the multilayer fabric are formed from an unstructured assemblage of fibers. The unstructured assemblage of fibers provides a large surface area whereon consequent biodegradation of said oils, greases and chemicals takes place permitting treated fluid to pass omnidirectionally through the unstructured assemblage of fibers and subsequently leach into the ground. Most particularly the multi-layer fabric of varying deniers may be wrapped around corrugated plastic pipe of the type well known in the field of drainage or leaching fields. Additionally, the fabric layers may be pretreated with chemicals, bacteria, and/or microbes such as known oil digesting microbes in order to particularize the use of the apparatus in the processing or treating of fluids.

The invention has the particular objectives, features and advantages of: 1) Multiple layers of fabric; 2) Fabric layers of varying deniers; 3) Useful in wrapping corrugated plastic pipe; 4) With the selection of fabric, fabric properties such denier, thickness, retention quality such as hydrophobic or hydrophilic characteristic, specific fluid treatment objective can be met; 5) The multilayer fabric provides boundaries/interfaces and regions within which specifically chosen bacteria, chemicals, microbes and the like may be introduced to facilitate the biodegradation of specifically chosen undesirable materials;and 6) Improve performance over the currently known leach fields.

Even more particularly, the invention is particularly useful in combination with the septic tank maze apparatus defined and described in Applicant's U.S. Pat. No. 5,429,752 Issued Jul. 4, 1995. The septic tank having such a maze incorporated therein has an outflow into a leach system of effluent or leachate which is substantially devoid of solids.

2. Description of the Prior Art

Suspended solids have plagued the septic system and waste water treatment industry more in the last ten (10) or more years than in previous years. The increase in the problem is due in part to the evolution and development of some of the modern day cleaners now make cleaning easier in that they cause grease and oil to dissolve into the water. The major problem with the septic tank is that the suspended solids in passing through the tank neither cool nor make contact at a slow enough pace to separate from the water.

Lint and fuzz has also been an ongoing problem for the septic tank to control. This material stays suspended in the septic tank liquid and normally passes through, remaining suspended in the effluent which subsequently also causes problems in the leach system connected with the septic tank.

Septic tanks generally available do not effectively provide for the removal, in a manner which does not effect the cost and the performance characteristics of the septic treatment system, of suspended solids that are typically found in septic tank liquid. It is important that the amount of suspended solids that leave the treatment tank be minimal so as not to adversely affect the subsequent treatment of the waste water/effluent. A leach field, for example, is adversely effected because the suspended solids will clog receiving layer and also adversely affect the absorption characteristics of the leach bed.

Currently there are designs and equipment that attempt the removal of the suspended solids. All of those known to the inventor of the now patented precipitation apparatus defined in U.S. Pat. No. 5,429,75 have failed to address the problem in an efficient manner because all the efforts attempt to "filter" the liquid. Filtration creates an additional set of problems. The filters can quickly become plugged slowing down or completely blocking the flow through of the liquid through the treatment tank. The filters are expensive and are costly to maintain. Applicant's patented precipitation apparatus greatly reduces the level of suspended solids exiting the treatment tank and entering the leach system.

It would be advantageous to have a treatment system which would include a leach system which would, more efficiently and effectively process the leachate or effluent from the septic tank or precipitation apparatus. The obvious consequences of such an improved fluid conducting conduit structure for use within a drainage field, would be longer life, less area needed to handle a specific amount of outflow of liquid and a cleaner and safer treated liquid returning to the environment. The improved fluid conducting conduit structure defined and claimed herein provides these advantages without a large increase in cost, does not require any additional maintenance and, in fact, requires less maintenance, is incorporatable into standard treatment designs and configurations, would be easily installed as new or replacements into existing and in-place leach fields and would provide flexibility to incorporate a variety of specially designed uses to result in a custom system based upon special or specific needs within the treatment system.

There nothing currently available which satisfies these needs and objectives. However, the invention disclosed herein does meet all of these objectives.

The following patents relate to the technology of the present invention but none of them meets the objects of the disclosed and claimed improved system in a manner like that of the instant invention. Additionally none are as effective and as efficient as the instant improved conduit system.

U.S. Pat. No. 3,976,578 to Beane discloses a protective sleeve for corrugated drainage tubes. The protective sleeve is a continuous tubular sleeve of knit fabric material which is slipped over one or more sections of corrugated flexible drainage pipe and acts as a filter to keep rocks, dirt, mud, pieces of clay, and the like from clogging the openings in the corrugated drainage pipe while allowing the water to pass through. Disclosed is a knit fabric preferably formed by lock stitches and is inherently elastic.

U.S. Pat. No. 4,909,665 to Caouette discloses a fabric wrapped corrugated structure. The fabric wrapping comprises an outer fabric combined with a grid mesh separation element. It is disclosed that the fabric may be of the woven or non-woven type and that the fabric may be bonded to the grid mesh. Further, Caouette discloses that the grid mesh may take many different forms as long as one set of cross members or other members such as dimples on a planar structure or fibrous material provides some separation of the fabric above the peaks of the corrugated pipe.

U.S. Pat. No. 5,224,832 to Gonczy et al. discloses a multilayer insulation blanket used in heat transfer technology which can be wrapped around a structure. The Gonczy patent does not disclose the use of multilayer fabrics of varying deniers and does not disclose the liquid permeability of the multilayer blanket.

U.S. Pat. No. 4,288,321 to Beane discloses a drain tile and a pile fabric filter sleeve. The knit fabric of the '321 patent to Beane is provided over the drainage conduit to facilitate efficient liquid flow. The knit fabric is also impregnated with suitable chemical agents for counteracting anticipated chemical reaction particle intrusions. The knit fabric is further disclosed to be formed of stitches defining a ground and defining terry loops extending from the ground and being directed in a predetermined generally radial direction relative to the longitudinal axis of the drainage conduit.

U.S. Pat. 4,904,113 to Goddard et al. discloses a highway edgedrain. The edgedrain comprises a tube inserted into a fabric sheath. The fabric sheath of the '113 patent is preferably of a nonwoven fabric and of a geotextile composition. The sheath acts a filter to prevent the passage of large particles or rocks into the tube. Further the sheath is disclosed as being made from a material of a single density.

U.S. Pat. No. 4,662,778 to Dempsey discloses a drainage mat. Most significantly, the '778 patent discloses a drainage material with extended surface which is a two-layer composite of polyester non-woven filter fabric heat bonded to an expanded nylon non-woven matting such as ENKADRAIN™ brand of three-dimensional composite.

U.S. Pat. No. 5,002,427 to Kambe et al. discloses a hydrophobic material used for drainage of a culvert. The '427 patent discloses a textile or knit fabric having large and small mesh portions.

The patents noted herein provide considerable information regarding the developments that have taken place in this field of technology. Clearly the instant invention provides many advantages over the prior art inventions noted above. Again it is noted that none of the prior art meets the objects of the multilayered fabric as used in septic and waste water treatment in a manner like that of the instant invention. None of them are as effective and as efficient as the instant combination of multilayered fabric and corrugated pipe combination for use in the management of effluent drainage systems.

Some particular aspects of interest for the multilayer fabric wrapped corrugated pipe invention are:

1. Longer life and no shadow effects;
2. Less masking;
3. More storage and breakdown area within the fabric layers;
4. Different grades of bacterial area;
5. Different interfaces for bacteria;
6. The division of different types of material;
7. Less clogging;
8. Septic use and floor drain use;
9. May be used over valley with any material that gives spacing and may also be used over smooth wall pipe;
10. May be used on incoming/outgoing liquids, that is the process would work for liquid moving from within to without the pipe or moving from without to within;
11. Any pretreatment of surface or subsurface fluids to include trapping collecting or dispersing fluids into and out of the ground;
12. Fabric may be pretreated with chemical, bacteria and/or combinations such pretreatment may be specific for applications such as oil-spill or the like;
13. Multi-layered fabrics and different deniers and different thicknesses may be combined again to achieve specific functions;
14. Treating liquids on the inside, trapping things inside—different fabrics exhibit retaining properties relative to specific materials and likewise different materials have varying treatment properties for different substances such as oil and effluent;
15. At all of the interfaces of the multilayered fabric and at the interface of the fabric with the conduit surface and the soil, fluids are being treated in a progressive manner resulting in a treated fluid having an acceptable standard of quality.
16. May be used on corrugated or smooth-walled structures or any fluid-carrying structure that passes fluids through itself or through holes/slots/cuts over/under/through/around.

By using multilayers one is able to have a medium for different types of bacteria to collect on and break down on as well as divide them by particle size. All prior systems have structures with members which are pressed tightly against the pipe itself, causing shadowing to take place where the fabric touches the pipe or the members. By using multilayers of fabrics starting with the very coarse denier working down to a fine denier, one is able to alleviated all of the shadowing effect which has never before been achieved. At the same time, larger particles are being sorted or separated from smaller particles, allowing the bacteria in the effluent to work more efficiently on these particles.

It should be noted that multilayered fabrics may be used with basically all chamber type systems such as for example infiltraters, contactors, bio-diffusers and with smooth-walled perforated pipe as well as corrugated plastic pipe. The multilayer fabric could be used inside of a product known as ELJEN DRAIN to extend the life of the product.

Because of the fibers being used in multilayers the ability of the aerobic bacteria to work on the particles is increased due to the ability of the liquids to be wicked throughout the fabrics (due to capillary action) thereby inducing more air, which will also change the state of the nitrogen content and other chemicals within the effluent so they may change more readily into gas and escape from the soils to the atmosphere above. Within the multiple layers there will be more storage area for the fine suspended particles that frequently clog standard systems. Oils, greases and chemicals contained in the fluids to be treated and entering within the fluid conducting conduit structure are entrapped within at least one of the first layers and at least one additional layer of fabric and particularly on the unstructured assemblage of fibers. The unstructured assemblage of fibers provides a large surface area whereon consequent biodegradation of said oils, greases and chemicals takes place permitting treated fluid to pass omnidirectionally through the unstructured assemblage of fibers.

With the use of multilayers of fabrics it is possible that one can set up systems which would handle garage floor drain wastes by allowing the bacteria action to take place in the first few layers, the oil to be trapped on other layers, and the water to pass through the final layers, then returned back to the clean soils. The floor drain fluid would be directed to a treatment bed or field similar to a leach field. In the treatment field would be conduit having means for allowing the passage of the floor drain fluid outwardly of the conduit and subsequently into the multilayer fabric wrapped around or at least covering the conduit. The fabric may be specially treated to process the particular drain fluid in order to place it in condition to be returned to the earth.

The INFILTRATOR™ brand of leaching structure, with the MICRO-LEACHING CHAMBERS™ brand of wall perforations is a chamber device used in leaching systems and is considered herein as a conduit. This form of conduit directs fluid flow even though it is somewhat similar to a semicircular cross section of a length perforated corrugated pipe. That is to say, if perforated corrugated pipe was halved along its axis, and the halves were laid in trenches with the opening of the half downwardly directed, a conduit similar to this brand of leaching conduit would result. Multilayer fabric having the characteristics previously noted, placed over this device will result in improved performance. Further, the multilayer fabric placed across the downwardly directed open portion would likewise improve the performance of the leaching system.

The use of multilayer fabric would also permit cleaning of water coming into a pipe so that it could be possible to take water that has been contaminated (areas of contaminated soil) and pass it through the multilayers and have bacterial growth on the outer surface and have cleaner water as it goes in the system. It would be effective in the removal of oils, greases and other chemicals. In the application where fluid to be treated is entering the conduit or pipe, the layer of fabric in contact with the pipe may have a denier lower in value which is finer than the denier of the adjacent additional/outer layer of the multilayer fabric. Where there are more than two (2) layers, it is important to note that each additional layer has a denier different from each additional layer adjacent thereto. In other words, where fluid is moving from inside to outside, the first layer will be more coarse than the coarseness of the next layer. Another layer over the next layer need only have a level of coarseness different than that of the next layer. Further, if yet another layer was added, it is only necessary that the coarseness of that layer be different from the layers adjacent.

It should be noted that the use of such fabrics with any kind of septic system or drainage system will result in improved performance. By allowing multiple layers of bacteria to form around the interior of the different layers, one can ultimately reduce the amount of necessary leach area surface that is needed for the system to operate properly. On most septic systems there is only one bacterial interface surface. By doing multiple layers of fabrics one not only maintains the initial surface area which is the soil interface with the fabric, but bacterial growth will take place on the multiple layers. For each layer on which bacteria grow, the amount of leach area surface needed to do the job is significantly reduced.

It is also important to note that with the use of the multilayer fabric liquids will be diffused/dispersed without channeling the liquids in a forced direction adding considerably to the life of any septic system.

SUMMARY OF THE INVENTION

This invention most generally relates to a device/apparatus for using a multilayer fabric of varying deniers for the processing and treatment of fluids which must be treated to remove materials so that the resultant treated fluid may be reused and/or returned to the earth and particularly to the water table. More particularly the invention relates to the use of multilayer fabric, each layer being of selected denier, in combination with conduit, either smooth-walled or corrugated, in a drainage field or leaching system usually associated with a septic tank or system. Most particularly the multilayer fabric of varying deniers, each layer have a coarseness or denier different from the coarseness or denier of all adjacent layers, may be wrapped around corrugated plastic pipe of the type well known in the field of drainage or leaching fields. Additionally, the fabric layers may be pretreated with chemicals, bacteria, and/or microbes such as known oil digesting microbes in order to particularize the use of the apparatus in the processing or treating of fluids.

An object of the invention is to provide an apparatus easily and economically maintainable and which is effective to process liquid outflowing from a septic tank or treatment tank and cause the outflow liquid or effluent to be more efficiently and more effectively processed and the processed liquid returned to the ground water system.

A further object of the invention is to provide an apparatus which is easily and economically adaptable to meet specific design criteria which are based upon types and quantity of suspended solids found or expected in a treatment system and which when in use, will increase the life expectancy of a leaching system and reduces the normal area of a leach system.

A still further object of the invention is to provide an apparatus which because of its use reduces ground water contamination.

A yet still further object of the invention is to provide an apparatus for use within a drainage field, which drainage field is in combination with disposal and irrigation systems used in treatment of fluids and dispersal of fluids, the structure comprising: corrugated conduit having an outer surface of a plurality of peaks and valleys and a plurality of perforations located circumferentially within each of the valleys. Each of the plurality of perforations provides flow communication from conduit interior to conduit exterior. There is also a first layer of fabric wrapped around the outer surface of the corrugated conduit; and at least one additional layer of fabric overlaying the first layer with, the first layer and each of the at least one additional layer of fabric having a predetermined denier and predetermined thickness. The predetermined denier of the first layer is greater than the predetermined denier of each of the additional layers of fabric and each of the additional layers has a denier different from each of the additional layer adjacent thereto. The predetermined denier and thickness is dependent upon the fluid being treated and dispersed and the drainage field size, composition and geometry. The first layer and the at least one additional fabric layers are formed from an unstructured assemblage of fibers. The unstructured assemblage of fibers is typically supported by an outer sheeting. Oils, greases and chemicals contained in the fluids to be treated and entering within the fluid conducting conduit structure are entrapped within at least one of the first layer and the at least one additional layer of fabric on the unstructured assemblage of fibers. The unstructured assemblage of fibers provides a surface area wherein consequent biodegradation of the oils, greases and chemicals takes place permitting treated fluid to pass omnidirectionally through the unstructured assemblage of fibers and subsequently leach into the ground.

A primary object of the invention is to provide an improved fluid conducting conduit structure for use within a drainage field, which drainage field is in combination with disposal and irrigation systems used in treatment of fluids and dispersal of fluids, using conduit having an outer surface and having a plurality of perforations in the outer surface to the interior of the conduit and located at predetermined locations along an axis of the conduit, the improvement comprises; a first layer of fabric wrapped around the outer surface of the conduit; and at least one additional layer of fabric overlaying the first layer with, the first layer and each additional layer of fabric having a predetermined denier and predetermined thickness. The predetermined denier of the first layer is coarser than the predetermined denier of each additional layer of fabric. While the predetermined denier of the first layer being greater than the predetermined denier of each additional layer of fabric, each additional layer has a denier different from each additional layer adjacent thereto. The predetermined denier and thickness is dependent upon the fluid being treated and dispersed and the drainage field size, composition and geometry. At least one of the layers of the multilayer fabric is/are formed from an unstructured assemblage of fibers. The unstructured assemblage of fibers are supported by an outer sheeting. Oils, greases and chemicals contained in the fluids to be treated and entering within the fluid conducting conduit structure are entrapped within at least one of the first layers and at least one additional layer of fabric and particularly on the unstructured assemblage of fibers. The unstructured assemblage of fibers provides a large surface area whereon consequent biodegradation of said oils, greases and chemicals takes place permitting treated fluid to pass omnidirectionally through the unstructured assemblage of fibers and subsequently leach into the ground.

Another primary object of the invention is to provide the improved fluid conducting conduit structure with conduit which is plastic material.

Yet another primary object of the invention is to provide the improved fluid conducting conduit structure where the outer surface has a plurality of dents and detents spaced around outer surface resulting in a reduction of the outer surface area contacting the first layer of fabric.

A further object of the invention is to provide the improved fluid conducting conduit structure where at least one of the layers of fabric is pretreated with at least one composition selected from the group consisting of oil digesting microbes, Rid-X® brand of septic treatment by Reckitt & Coleman Inc., Drain Care Enforcer® Products, Inc. brand of septic tank treatment, K37 Roebic Septic Tank Treatment, K57 Cesspool Cleaner both by Roebic Laboratories, Inc.

A still further object of the invention is to provide the improved fluid conducting conduit structure for use within a drainage field using corrugated conduit having an outer surface of a plurality of peaks and valleys and having a plurality of perforations located circumferentially within each valley region. The corrugated conduit is preferably comprised of plastic material and wherein each of the peaks have a plurality of dents substantially equally spaced around each peak resulting in a reduction of outer surface area of the conduit contacting the first layer of fabric.

A particular object of the present invention is to provide a method for subterranean leaching and treating of outflow effluent from a septic system. The method for subterranean leaching comprises the steps of; wrapping corrugated conduit having a plurality of peaks and valleys and having a plurality of perforations located circumferentially within each valley region with a first layer of fabric, overlaying the first layer with at least one additional layer of fabric. The first layer and each one of the additional layers of fabric have a predetermined denier and predetermined thickness. The predetermined denier of the first layer is coarser than the predetermined denier of each additional layer of fabric. Any further layers each have denier or coarseness levels different from the coarseness of adjacent layers. The covered corrugated conduit are then placed end-to-end connected within trenches positioned according to a specific design of a leaching field. Flow connection is provided between an outflow aperture of the septic system and an inflow aperture of the covered corrugated conduit. The entire structure is covered over with soil.

These and further objects of the present invention will become apparent to those skilled in the art to which this invention pertains and after a study of the present disclosure of the invention.

DESCRIPTION OF THE PREFERRED EMBODIMENTS

The following is a description of the preferred embodiment of the invention. It is clear that there may be variations in the size and the shape of the apparatus, in the materials used in the construction and in the orientation of the components. However, the main features are consistent and are;

1) Multiple layers of fabric rather than screens;
2) Fabric layers of varying deniers and/or thickness;
3) Useful in wrapping smooth-walled and corrugated plastic pipe;
4) With the selection of fabric and fabric denier, specific fluid treatment objectives can be met;
5) The multilayer fabric provides boundaries/interfaces and regions within which specifically chosen bacteria, chemicals, microbes and the like may be introduced to facilitate the biodegradation of specifically chosen undesirable materials; and
6) Improve performance over the currently known leach fields.

While the layers of the multilayer fabric are characterized in terms of denier—the higher the number the more coarse the character of the fabric, it is obvious that, based upon the application of invention 10 or 10a, the degree of coarseness and the denier may range from the lowest of value to the highest of value for commercially available fabrics. The material fibers from which the fabric is made may also vary and the choice of fabric having different fiber material will be a function of the type of impurities within the fluid being treated as well as the flow rate and volume of fluid to be treated. Appropriate fabrics are available from TerraTex, Inc. such as TerraTex SD or TerraTex N04, with a mass per unit area of 4.5 and 4.0 oz per square yard respectively. Examples of fabrics which may be useful as layer 12a for treatment of fluid from within conduit 14 or 15 to outside structure 10 or 10a are: Contech Construction Products, Inc. brand of erosion-control products such as, Contech ECRM C-45, ECRM C-50 having an area density or a mass per unit area of 10 oz per square yard and 12 oz per square yard respectively and a denier of 450 and 500 respectively. BonTerra America, Inc. has a number of fabrics which may be used. Again, by example only SFB has similar characteristics to ECRM C-45 but the denier is about 300. Examples of fabrics which may be useful as any or all additional layers 12b for treatment of fluid from within conduit 14 or 15 to outside structure 10 or 10a are: American Engineering Fabrics, Inc. brand of erosion-control products such as the fabrics with product names, AEF 480, AEF 480 HS, AEF 680, AEF 680 HS having an area density or a mass per unit area of 4, 4, 6 and 6 oz per square yard respectively. The apparent opening size for all of these fabrics is between about 70 and 140. North American Green, Inc. also has a line of products which are useful in makeup of multilayer fabric 12. P300p has an area density or a mass per unit area of 12.8 oz per square yard and would be useful as first layer 12a for fluid going from within a pipe to outside of the pipe or as layer 12b when the fluid being processed or treated in coming into the pipe or conduit.

Regarding the layers of the multilayer fabric, it is important to note that at least one of the layers are formed from an unstructured assemblage of fibers. The unstructured assemblage of fibers are supported by an outer sheeting. Oils, greases and chemicals contained in the fluids to be treated and entering within the fluid conducting conduit structure are entrapped within at least one of the first layers and at least one additional layer of fabric and particularly on the unstructured assemblage of fibers. The unstructured assemblage of fibers provides a large surface area whereon consequent biodegradation of said oils, greases and chemicals takes place permitting treated fluid to pass omnidirectionally through the unstructured assemblage of fibers and subsequently leach into the ground.

Where the fluid to be treated comes from outside structure 10 or 10a to inside conduit 14 or 15, the fabrics identified for 12a would be layer 12b and those identified for layers 12b would be used for layer 12a. Where there are more than two (2) layers, it is important to note that each additional layer has a denier different from each additional layer adjacent thereto. In other words, where fluid is moving from inside to outside, first layer 12a will be more coarse than the coarseness of layer 12b. Another layer over layer 12b need only have a level of coarseness different than that of layer 12b. Further, if yet another layer was added, it is only necessary that the coarseness of that layer be different from the layer adjacent.

Reference is now made to FIGS. 1–5 all of which illustrate by sketch particular embodiments and features of the present invention when used to treat fluid which is contaminated from use and return the treated fluid to the water table.

Figure 1:
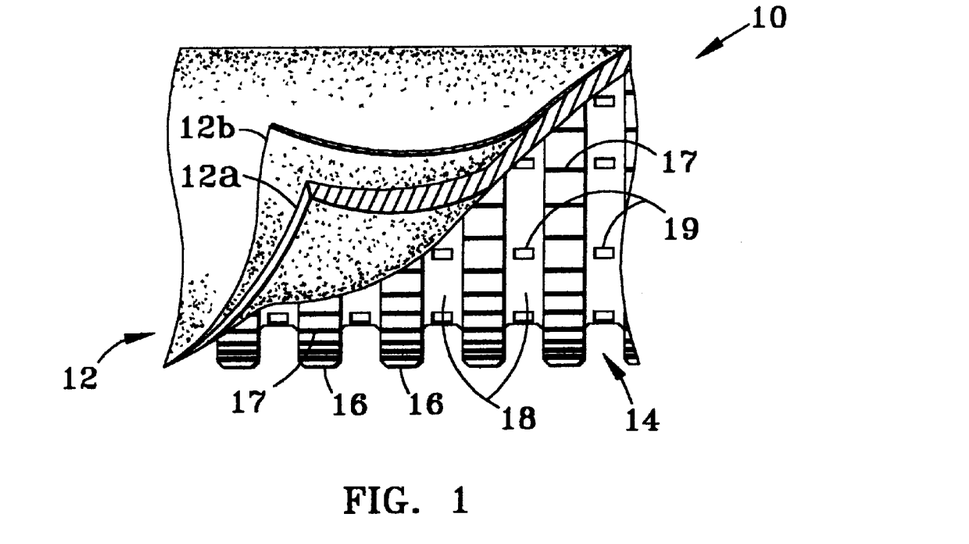
FIG. 1 is a schematic illustration of the invention showing multilayer fabric of varying deniers wrapped around corrugated pipe with a portion of the fabric cut-a-way thereby disclosing a plurality of dents or detents on the peaks of the pipe and disclosing a plurality of perforation in the valleys of the pipe.
Figure 2:
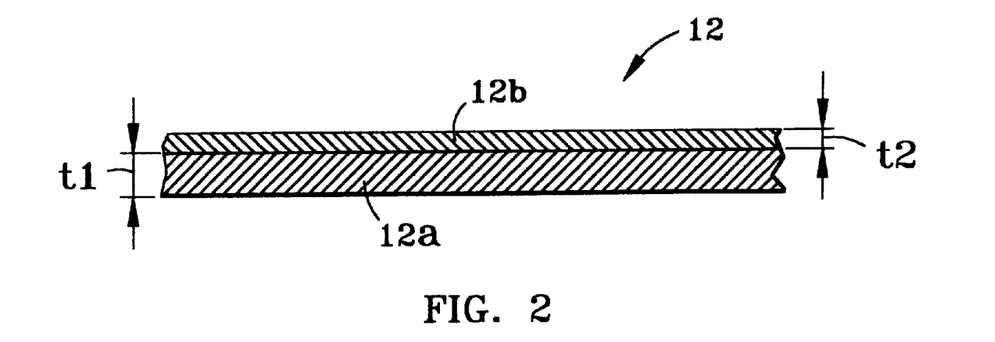
FIG. 2 is an edge view of the multilayer fabric having two layers and illustrating the fabric layer interface.
Figure 3:
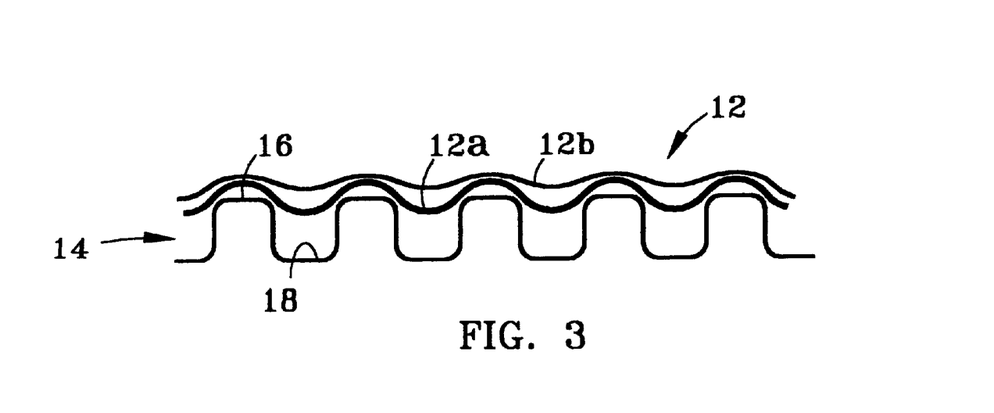
FIG. 3 is a side view schematic and partial cross section illustration of corrugated pipe having wrapped thereon two layer multilayer fabric.

In FIGS. 1–3 a schematic illustration of improved fluid conducting conduit structure 10 showing multilayer fabric 12. Multilayer fabric 12 has a first layer of fabric 12a of specific denier X and thickness t1 second layer of fabric 12b of specific denier Y<X and thickness t2. Where there are more than two (2) layers, it is important to note that each additional layer has a denier different from each additional layer adjacent thereto. In other words, where fluid is moving from inside to outside, first layer 12a will be more coarse than the coarseness of layer 12b. Another layer over layer 12b need only have a level of coarseness different than that of layer 12b. Further, if yet another layer was added, it is only necessary that the coarseness of that layer be different from the layer adjacent. Multilayer fabric 12 is wrapped around corrugated conduit 14. A portion of fabric 12 is cut-a-way thereby disclosing a plurality of dents or detents 17 on the peaks 16 of conduit 14 and disclosing a plurality of perforations 19 in valleys 18 of conduit 14. The fabric layer interface of multilayer fabric 12 having two layers, a first layer 12a and one additional layer 12b is illustrated in FIG. 2.

Figure 4:
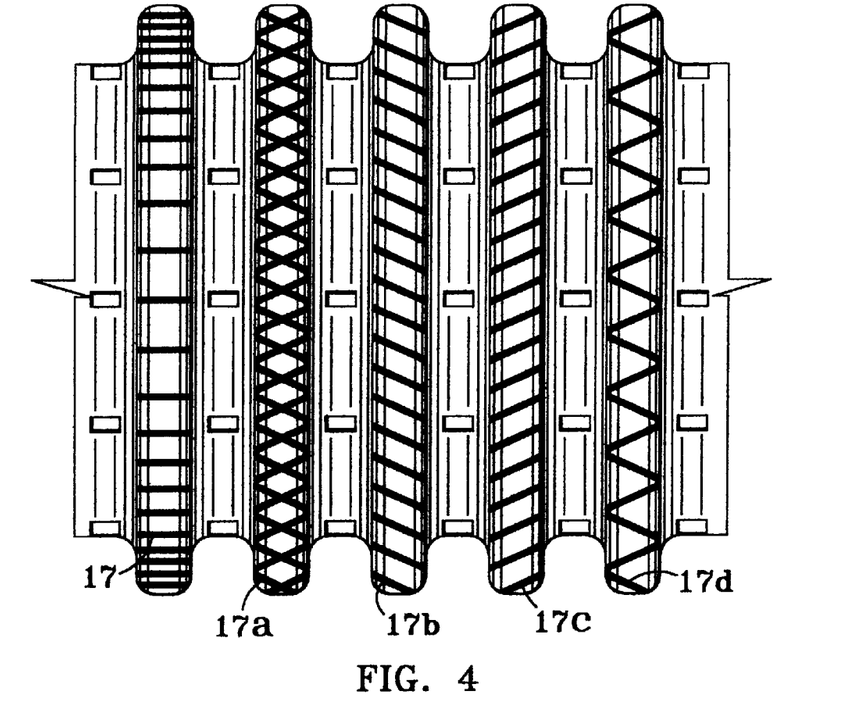
FIG. 4 is a schematic illustration used only to disclose various geometries of dents or detents on the peaks of the pipe and further illustrating that the perforation in the valleys may be slots rather than circular perforations.

It is important to note that where corrugated conduit of the type identified by numeral 14 is used, peaks 16 may have different geometries of detent or dents placed around each of the peak surfaces. Some of these different geometries of dents 17, 17a, 17b, 17c and 17d are shown in FIG. 4. They are all shown on the same section of conduit peaks 16 for reasons of convenience only. It is further noted that perforations 19 need not be circular. In fact Applicant has developed an improved method for putting perforations 19, which may be slots rather than circular in shape into valleys 18 of conduit 14.

Figure 5:
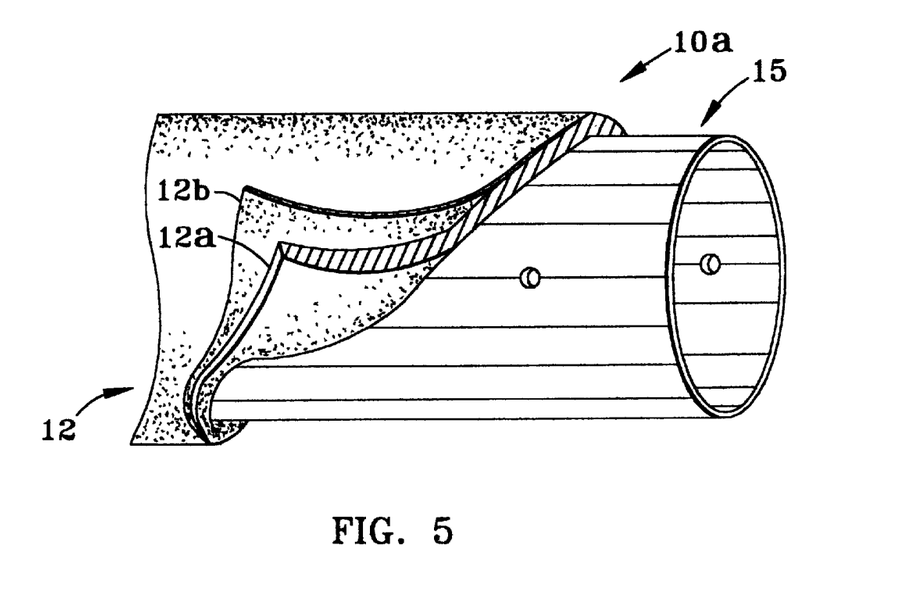
FIG. 5 is a schematic illustration of the invention showing multilayer fabric of varying deniers wrapped around smooth-walled pipe with a portion of the fabric cut-a-way thereby disclosing a plurality of dents or detents or scorrings on the outer surface of the pipe and representatively illustrating a plurality of perforation in the wall of the pipe.

While the preferred embodiment of the improved conduit is of the type identified in FIGS. 1, 3 and 4, it is clear that multilayer fabric 12 of varying deniers may be wrapped around smooth-walled perforated conduit/pipe 15 resulting in improved conduit 10a. FIG. 5 illustrates only representative number of perforations 19a. With a portion of fabric 12 cut-a-way a plurality of dents or detents or scorrings 17a is disclosing on the outer surface of pipe 15. The preferred material for use as "fabric" is the North American Green® brand of flexible channel liners. Particularly preferred is the type identified as P300P made of 100% UV stabilized polypropylene fiber matrix sewn between an extra heavy duty UV stabilized top net and heavy UV stable bottom net. The P300P is non-degradable mattings designed to provide temporary protection of high-discharge channels and shorelines during vegetation establishment and permanent reinforcement of the vegetable stand after maturity. The fibers are 0.7 lbs./sq.yd and the net is extra heavyweight UV stabilized. The thread is black polyester. Another preferred material for use as "fabric" is the LandLok Soil Erosion Green® brand of soil erosion mat. Particularly preferred is the type identified as product number 450G made by Synthetic Industries. As is apparent from the description of the manufacturer's description of the use of the material, use with septic leach field pipe was not ever contemplated.

Figure 6:
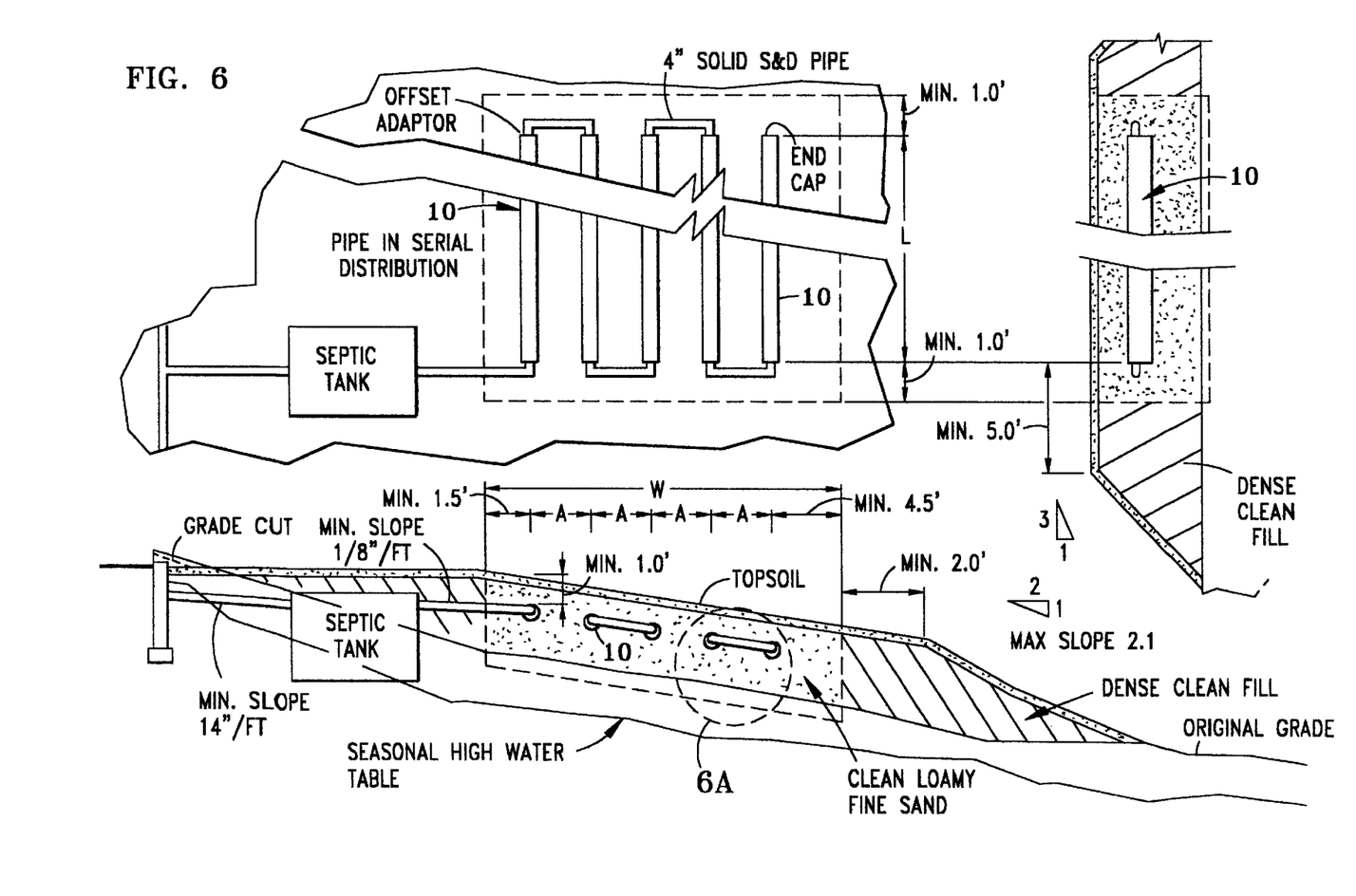
FIG. 6 is an exemplary design layout of a septic system illustrating the use of the invention, serially connected within a leach field having a slope.
Figure 6A:
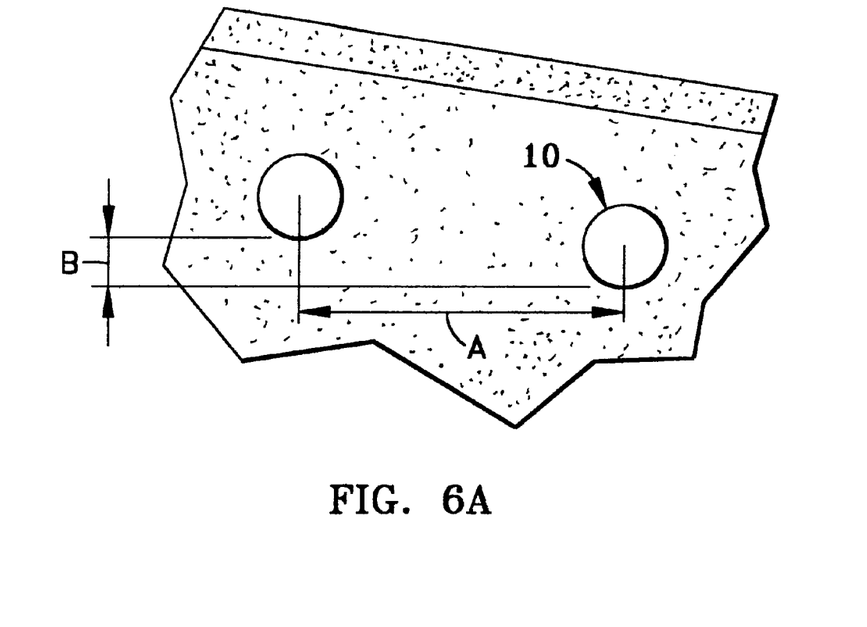
FIG. 6A is an enlargement of the interconnected wrapped conduit structure as used in a leaching system.

In describing the method for treating septic fluids using improved conduit 10 or 10a, reference may be made to FIG. 6 which depicts an exemplary design layout of a septic system illustrating the use of invention 10 or 10a, serially connected within a leach field having a slope. The method comprises the steps of: wrapping corrugated conduit, having a plurality of peaks and valleys and having a plurality of perforations located circumferentially within each valley region, with a first layer of fabric. Overlaying the first layer with at least one additional layer of fabric, the first layer and each of the at least one additional layer of fabric having a predetermined denier and predetermined thickness. The predetermined denier of the first layer is different than the predetermined denier of each additional layer of fabric and each additional layer has a denier different from each additional layer adjacent thereto. The predetermined denier and thickness is dependent upon the fluid being treated and dispersed and the drainage field size, composition and geometry. The first layer of fabric is formed from an unstructured assemblage of fibers. The unstructured assemblage of fibers is supported by outer sheeting where oils, greases and chemicals contained in the fluids to be treated and entering within the fluid conducting conduit structure and are entrapped within at least the first layer and at least one additional layer of fabric particularly on the unstructured assemblage of fibers. The unstructured assemblage of fibers provides a surface area wherein consequent biodegradation of the oils, greases and chemicals takes place permitting treated fluid to pass omnidirectionally through the unstructured assemblage of fibers and subsequently leach into the ground. The covered corrugated conduit is then placed within trenches positioned according to a specific design of a leaching field. Flow connection is then provided between an outflow aperture of the septic system and an inflow aperture of the covered corrugated conduit. Soil is then placed over the entire structure.

Figure 7:
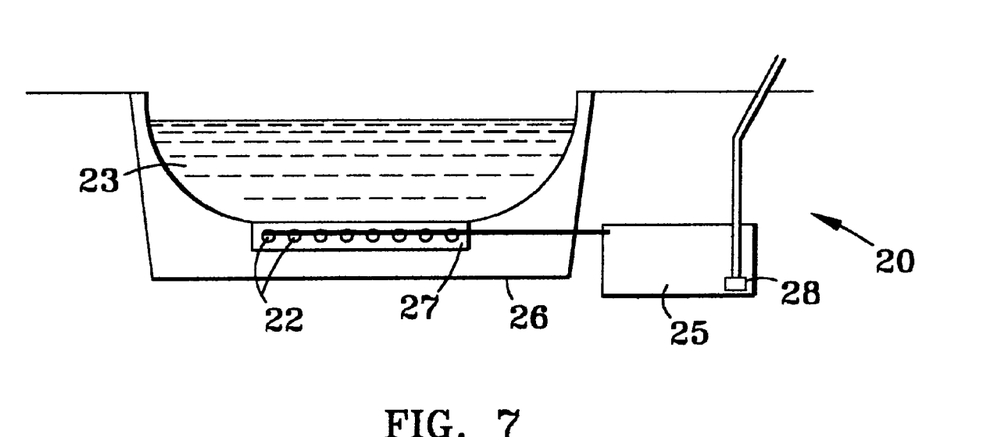
FIG. 7 is an a schematic illustration of the invention showing multilayer fabric wrapped around a conduit so as to permit cleaning of contaminated fluid coming into a pipe or conduit wrapped or covered with a multilayer fabric.

FIG. 7 is an a schematic illustration of the invention 10 or 10a showing multilayer fabric 12 wrapped around conduit 14 or 15, the combination or combinations of elements 10 or 10a, 12 and 14 or 15 which are identified in FIG. 7 as element 22, so as to permit cleaning of contaminated fluid coming into such a pipe or conduit 14 or 15 so that it is possible to take water that has been contaminated and may be held in holding area 23 (areas of contaminated soil) and pass it through multilayer fabric 12. Properly pretreated layers 12a and/or 12b of multilayer fabric 12 could initiate bacterial growth on the outer surface or remove oil and grease and have cleaner water as it goes in system 20. It would be effective in the removal of oils, greases and other chemicals. Where fluid to be treated is entering improved conduit 10 or 10a from the outside, the layer of fabric 12a in contact with pipe 14 or 15 would have a denier which is less than the denier of additional/outer layers 12b of multilayer fabric 12. Recovered, treated fluid from holding area 23 is passed into treated fluid holding tank 25. Liner material 26 holds both a bed of sand 27 covering the entire septic system structure, and any escaping fluid. There is also provided a means for pumping 28 which pumps treated fluid from treated fluid holding tank 25 so that the treated fluid may be reused and/or returned to the earth, particularly the water table.

Additives may be incorporated into any one or all of the layers of multilayer fabric 12. Rid-X® brand of septic tank additive may be use to improve the biodegradation of the effluent. Additional to Rid-X® brand of septic treatment by Reckitt & Coleman Inc., Drain Care Enforcer® Products, Inc., K37 Roebic Septic Tank Treatment, K57 Cesspool Cleaner both by Roebic Laboratories, Inc. are examples of other products useful with the invention hereof. BOOM™ has available sorbent material which is effective in the clean up of oil spills. By incorporating pads such as product A-200H or A-200LF or A-200U or A-300 within layers of multilayer fabric 12, fluids containing oil based contaminants would be most effectively treated by improved conduit 10 or 10a. 3M Company makes a sorbent in roll form. WX-15239 is representative of product which also could be incorporated into the instant fabric 12.

The use of multiple layers of fabric results in a substantial increase in the efficiency of bacterial treatment of effluent. The increase in bacterial growth and treatment of effluent has been found to be four to six time faster than found in a single layer system. Each layer of surface separates different materials and contains different types of bacteria allowing the design of systems which address the solution to specific problems. The present invention provides the very substantial advantage in that it causes bacteria to be concentrated on specific elements in the effluent. This occurs at different locations throughout the fabric layers resulting in more rapid and more efficient bacterial breakdown. The multiple layer fabric covered device has been approved for use in several states. Because of the increase in performance and efficiency of septic systems using the device and methods disclosed herein, the costs of septic systems are halved and the area required for the leach field is one-third (⅓) the area of a leach field using conventional systems.

It is thought that the present invention, the method and the apparatus for using a multilayer fabric of varying deniers for the processing and treatment of fluids which must be treated to remove materials so that the resultant treated fluid may be reused and/or returned to the earth and many of its attendant advantages is understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A fluid conducting conduit structure for use within a drainage field, which drainage field is in combination with disposal and irrigation systems used in treatment of fluids and dispersal of fluids, said structure comprising:

corrugated conduit having an outer surface of a plurality of peaks and valleys and a plurality of perforations located circumferentially within each of said valleys, each said plurality of perforations providing flow communication from conduit interior to conduit exterior;

a first layer of fabric wrapped around said outer surface of said corrugated conduit; and at least one additional layer of fabric overlaying said first layer with, said first layer and each said at least one additional layer of fabric having a predetermined denier and predetermined thickness, said predetermined denier of said first layer being greater than said predetermined denier of each said additional layer of fabric and each said additional layer having a denier different from each said additional layer adjacent thereto, wherein at least said first layer of fabric is formed from an unstructured assemblage of fibers said unstructured assemblage of fibers supported by outer sheeting where oils, greases and chemicals contained in said fluids to be treated and entering within said fluid conducting conduit structure are entrapped within said at least said first layer and said at least one additional layer of fabric on said unstructured assemblage of fibers which said unstructured assemblage of fibers provides a surface area wherein consequent biodegradation of said oils, greases and chemicals takes place permitting treated fluid to pass omnidirectionally through said unstructured assemblage of fibers and subsequently leach into the ground.

2. The fluid conducting conduit structure for use within a drainage field according to claim 1, wherein said corrugated conduit is comprised of plastic material.

3. The fluid conducting conduit structure for use within a drainage field according to claim 2, wherein said plurality of perforations are slots and wherein each said plurality of peaks have a plurality of dents substantially equally spaced around each said peak resulting in a reduction of said outer surface area of said conduit contacting said first layer of fabric.

4. The fluid conducting conduit structure for use within a drainage field according to claim 3, wherein at least one of said layers of fabric is pretreated with at least one composition selected from the group consisting of oil digesting microbes, chemicals and bacteria.

5. The fluid conducting conduit structure for use within a drainage field according to claim 1, wherein at least one of said layers of fabric is pretreated with at least one composition selected from the group consisting of oil digesting microbes, chemicals and bacteria.

6. A fluid conducting conduit structure for use within a drainage field, which drainage field is in combination with disposal and irrigation systems used in treatment of fluids and dispersal of fluids, said structure comprising:

conduit having an outer surface and having a plurality of perforations in said outer surface, each said plurality of perforations providing flow communication from conduit interior to conduit exterior and located at predetermined locations along an axis of said conduit;

a first layer of fabric wrapped around said outer surface of said conduit; and at least one additional layer of fabric overlaying said first layer with, said first layer and each said at least one additional layer of fabric having a predetermined denier and predetermined thickness, said predetermined denier of said first layer being greater than said predetermined denier of each said additional layer of fabric and each said additional layer having a denier different from each said additional layer adjacent thereto, wherein at least said first layer of fabric is formed from an unstructured assemblage of fibers said unstructured assemblage of fibers supported by outer sheeting where oils, greases and chemicals contained in said fluids to be treated and entering within said fluid conducting conduit structure are entrapped within said at least said first layer and said at least one additional layer of fabric on said unstructured assemblage of fibers which said unstructured assemblage of fibers provides a surface area wherein consequent biodegradation of said oils, greases and chemicals takes place permitting treated fluid to pass omnidirectionally through said unstructured assemblage of fibers and subsequently leach into the ground.

7. The fluid conducting conduit structure for use within a drainage field according to claim 6, wherein said conduit is comprised of plastic material.

8. The fluid conducting conduit structure for use within a drainage field according to claim 7, wherein said outer surface has a plurality of dents spaced around said outer surface resulting in a reduction of the area of said outer surface of said conduit contacting said first layer of fabric.

9. The fluid conducting conduit structure for use within a drainage field according to claim 8, wherein at least one of said layers of fabric is pretreated with at least one composition selected from the group consisting of oil digesting microbes, chemicals and bacteria.

10. The fluid conducting conduit structure for use within a drainage field according to claim 6, wherein at least one of said layers of fabric is pretreated with at least one composition selected from the group consisting of oil digesting microbes, chemicals and bacteria.

11. A fluid conducting conduit structure for use in recovery and treatment of treatable fluids, said treatable fluid flowing from without said fluid conducting conduit structure to within said fluid conducting conduit structure, said recovered and treated fluid directed within said conduit to a means for storage thereof comprising:

a conduit having an outer surface and having a plurality of perforations in said outer surface each said plurality of perforations providing flow communication from without said conduit to within said conduit and located at predetermined locations along an axis of said conduit;

a first layer of fabric wrapped around said outer surface of said conduit; and at least one additional layer of fabric overlaying said first layer, an outermost layer being one of said at least one additional layer of fabric, said outermost layer having a denier greater than said first layer and greater than any of the other of said at least one additional layer, wherein at least said outermost layer of fabric is formed from an unstructured assemblage of fibers said unstructured assemblage of fibers supported by outer sheeting where oils, greases and chemicals contained in said fluids to be treated and entering from without said fluid conducting conduit structure to within said fluid conducting conduit structure are entrapped within said at least said outermost layer and said at least one additional layer of fabric on said unstructured assemblage of fibers which said unstructured assemblage of fibers provides a surface area wherein consequent biodegradation of said oils, greases and chemicals takes place permitting treated fluid to pass omnidirectionally through said unstructured assemblage of fibers and subsequently into said conduit, said first layer, said outermost layer and each said at least one additional layer of fabric having a predetermined denier and predetermined thickness, said predetermined denier of said first layer being less than said predetermined denier of each said additional layer of fabric and each said additional layer having a denier different from each said additional layer adjacent thereto, and wherein at least one of said at least one additional layer of fabric overlaying said first layer of fabric, is treated to initiate bacterial growth, said high denier outermost layer effective to trap said oils, greases and chemicals for treatment to remove said oils, greases and chemicals thereby recovering said treatable fluids into said conduit.

12. The fluid conducting conduit structure for use in recovery and treatment of treatable fluids, according to claim 11, wherein said conduit is comprised of plastic material.

13. The fluid conducting conduit structure for use in recovery and treatment of treatable fluids, according to claim 1, wherein said outer surface has a plurality of dents spaced around said outer surface resulting in a reduction of said outer surface area of said conduit contacting said first layer of fabric.

14. The fluid conducting conduit structure for use in recovery and treatment of treatable fluids, according to claim 13, wherein at least one of said layers of fabric is pretreated with at least one composition selected from the group consisting of oil digesting microbes, chemicals and bacteria.

15. The fluid conducting conduit structure for use in recovery and treatment of treatable fluids, according to claim 11, wherein at least one of said layers of fabric is pretreated with at least one composition selected from the group consisting of oil digesting microbes, chemicals and bacteria.

16. A method for subterranean leaching and treating of outflow effluent from a septic system, said method for subterranean leaching comprising the steps of:

wrapping corrugated conduit having a plurality of peaks and valleys and having a plurality of perforations located circumferentially within each said valley region with a first layer of fabric;

overlaying said first layer with at least one additional layer of fabric, said first layer and each said at least one additional layer of fabric having a predetermined denier and predetermined thickness, said predetermined denier of said first layer being different than said predetermined denier of each said additional layer of fabric and each said additional layer having a denier different from each said additional layer adjacent thereto, wherein at least said first layer of fabric is formed from an unstructured assemblage of fibers said unstructured assemblage of fibers supported by outer sheeting where oils, greases and chemicals contained in said fluids to be treated and entering within said fluid conducting conduit structure are entrapped within said at least said first layer and said at least one additional layer of fabric on said unstructured assemblage of fibers which said unstructured assemblage of fibers provides a surface area wherein consequent biodegradation of said oils, greases and chemicals takes place permitting treated fluid to pass omnidirectionally through said unstructured assemblage of fibers and subsequently leach into the ground;

placing said covered corrugated conduit within trenches positioned according to a specific design of a leaching field;

providing flow connection between an outflow aperture of said septic system and an inflow aperture of said covered corrugated conduit; and covering said corrugated conduit with soil.

* * * * *